(12) United States Patent
Ono et al.

(10) Patent No.: US 7,388,957 B2
(45) Date of Patent: Jun. 17, 2008

(54) ELLIPTIC CURVE EXPONENTIATION APPARATUS THAT CAN COUNTER DIFFERENTIAL FAULT ATTACK, AND INFORMATION SECURITY APPARATUS

(75) Inventors: Takatoshi Ono, Ama-gun (JP); Natsume Matsuzaki, Mino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 803 days.

(21) Appl. No.: 10/763,958

(22) Filed: Jan. 23, 2004

(65) Prior Publication Data
US 2004/0247115 A1    Dec. 9, 2004

(30) Foreign Application Priority Data
Jan. 28, 2003    (JP) ............................. 2003-018760

(51) Int. Cl.
H04K 1/00 (2006.01)
(52) U.S. Cl. .............................. 380/255; 380/28; 380/29
(58) Field of Classification Search ................. 380/255, 380/28, 29
See application file for complete search history.

(56) References Cited

FOREIGN PATENT DOCUMENTS

| EP | 1 237 322 | 4/2002 |
|----|-----------|--------|
| JP | 11-008616 | 1/1999 |
| JP | 2002-261751 | 9/2002 |
| JP | 2003-255831 | 9/2003 |

OTHER PUBLICATIONS

Implementation of Elliptic-Curve Cryptography on Mobile Healthcare Devices Malhotra, K.; Gardner, S.; Patz, R.; Networking, Sensing and Control, 2007 IEEE International Conference on Apr. 15-17, 2007 pp. 239-244.*
XML Document Encrypt Implementation Using Elliptic Curve Cryptosystem Sung, Kyung-Sang; Ko, Hoon; Oh, Hae-Seok; Convergence Information Technology, 2007, International Conference on Nov. 21-23, 2007 pp. 2473-2478.*
An elliptical cryptographic algorithm for rf wireless devices Owor, Robert Steven; Dajani, Khalil; Okonkwo, Zephyrinus; Hamilton, John; Simulation Conference, 2007 Winter Dec. 9-12, 2007 pp. 1424-1429.*
Antipa et al., "Validation of elliptic curve public keys", Public Key Cryptography-PKC 2003 6th International Workshop on Practice and Theory in Public Key Cryptography, Jan. 6, 2003, pp. 211-223.
Biehl et al., "Differential Fault Attacks on Elliptic Curve Cryptosystems", Advances in Cryptology, 20th Annual International Cryptology Conference, Aug. 20-24, 2000. Proceedings, Lecture Notes in Computer Science; vol. 1880, Berlin, Springer, DE Aug. 20, 2000, pp. 131-146.

* cited by examiner

Primary Examiner—David Jung

(57) ABSTRACT

Provided is an elliptic curve exponentiation apparatus that can counter the DFA when an elliptic curve exponentiation technique is used. A computation result verification unit 127 receives, as a computation result, an exponentiation-result-point (X, Y) from an elliptic curve computation unit 124. The computation result verification unit 127 computes $X^3+a \times X+b$, and computes $Y^2$, and outputs the received exponentiation-result-point when judging that $Y^2=X^3+a \times X+b$, and does not output the received exponentiation-result-point when not judging that $Y^2=X^3+a \times X+b$.

4 Claims, 11 Drawing Sheets

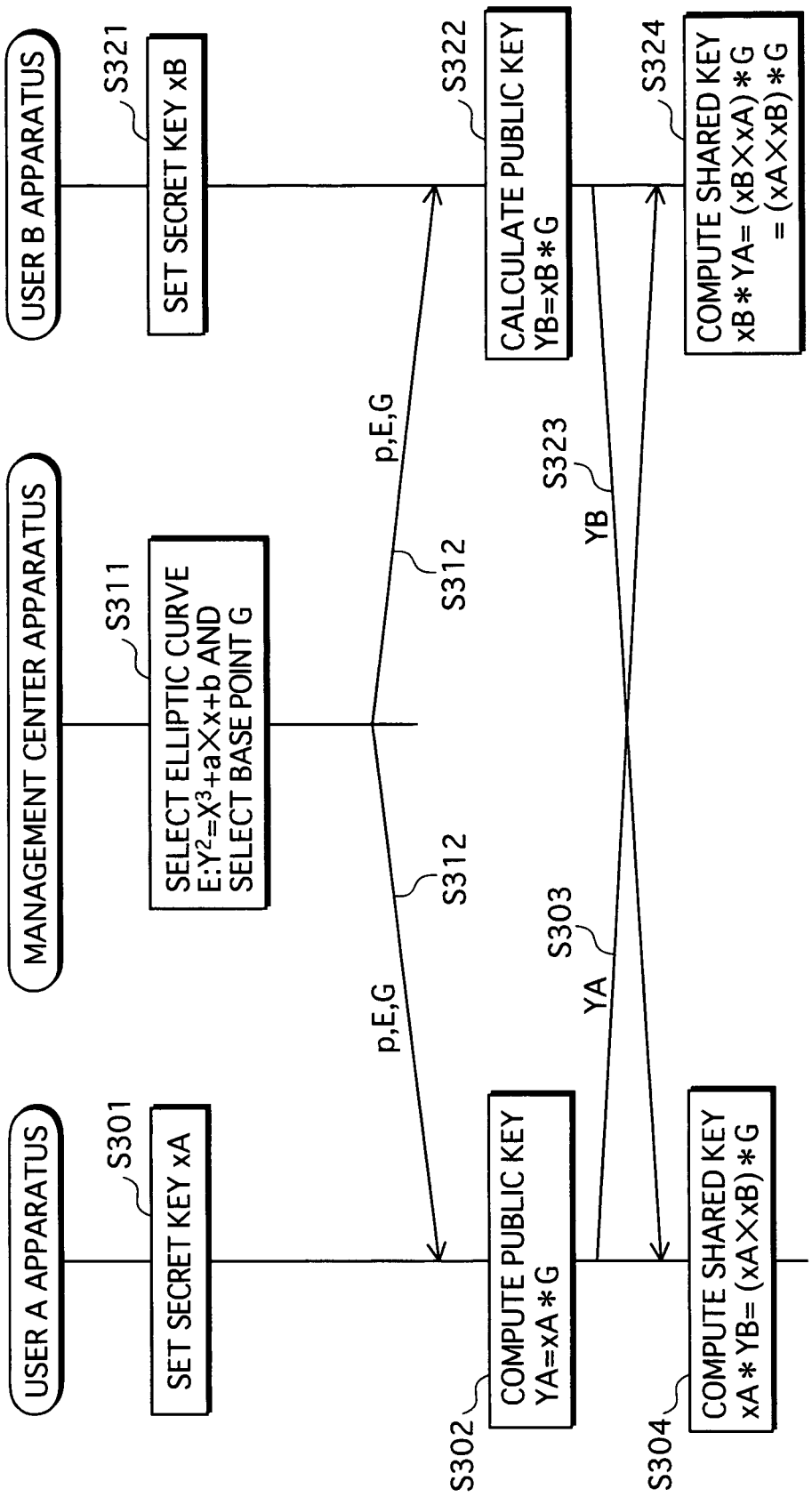

ELLIPTIC CURVE EXPONENTIATION APPARATUS THAT CAN COUNTER DIFFERENTIAL FAULT ATTACK, AND INFORMATION SECURITY APPARATUS

This application is based on an application No. 2003-018760 filed in Japan, the content of which is hereby incorporated by reference.

BACKGROUND OF THE INVENTION (1) Field of the Invention

The present invention relates to a computation processing technique using an elliptic curve, and in particular relates to a technique for countering Differential Fault Attack (DFA).

(2) Description of the Related Art

Public key cryptography has conventionally been known as a method for realizing confidentiality of information, authentication of information, etc.

According to public key cryptography, a pair of a secret key exclusively held by the user and a public key that is made public is generated. Encryption is performed using the public key, and decryption is performed using the secret key.

Despite its large amount of computation processing, public key cryptography, which does not require a secret key to be shared by a plurality of users, is often employed in such applications that require high security. Typical examples of public key cryptography include RSA cryptography and elliptical curve cryptography.

The security of public key cryptography is based on the discrete logarithm problem. Typical examples of the discrete logarithm problem are problems defined over finite fields and problems defined over elliptic curves. Here, the following describes a discrete logarithm problem defined over an elliptic curve. Assume that E(GF(p)) is an elliptic curve defined over a finite field GF(p), with an element G on the elliptic curve E being set as a base point when the order of the elliptic curve E is exactly divided by a large prime. In this case, the discrete logarithm problem is to compute an integer x, if any, that satisfies the equation;

Y=x*G, where Y is a given element on the elliptic curve E.

Here, p is a prime and GF(p) is a finite field that includes p elements. In this specification, the symbol "*" represents repeated additions of a point, i.e., an element, on the elliptic curve, and such computation involving "*" is referred to as the "computation of an elliptic curve exponentiation".

The security of public key cryptography is based on extreme difficulty of the discrete logarithm problem for the finite field GF(p) including a large number of elements.

For public key cryptography, a secret key is usually held by such means as an IC card that does not allow revealing of the key to third parties.

With the technique described above, secret information can be transmitted without being revealed to third parties. However, Japanese Laid-Open Patent Application No. 2002-261751 refers to the emergence of attacks of unauthorized obtaining of secret information by analyzing various information output from an IC card or the like. One type of such attacks is the DFA.

The DFA is made by a third party intentionally causing a failure in an IC card that is being engaged in decryption processing, by applying overcurrent or the like. The IC card then outputs a value that had been computed before the occurrence of the failure. The third party collects a large number of values output from the IC card by repeating this. The third party then obtains secret information by analyzing the collected values.

To counter this problem, Japanese Laid-Open Patent Application No. H11-8616 discloses an IC card particularly designed to deal with the DFA. This IC card includes a coprocessor, and can realize rapid processing of exponential remainder computation for generating digital signature according to RSA cryptography, by Chinese remainder theorem, using a prime factor of a public key n. This IC card can compute, at the same time with data generated in the computation process of Chinese remainder theorem, error-detecting code for the data. The IC card then can compute error-detecting code again for the data when the digital signature is generated, and compare the computed error-detecting code with the stored error-detecting code.

Problems to be Solved by the Invention

A problem here is that the technique disclosed in Japanese Laid-Open Patent Application No. H11-8616, though applicable to apparatuses employing RSA cryptography, cannot be applied to apparatuses employing elliptic curve cryptography.

SUMMARY OF THE INVENTION

In view of the above problem, the object of the present invention is to provide an elliptic curve exponentiation apparatus that can counter the DFA when an elliptic curve exponentiation technique is used, and also to provide an elliptic curve exponentiation method, a computer program for computation of an elliptic curve exponentiation, and an information security apparatus.

The above object of the present invention can be achieved by an elliptic curve exponentiation apparatus that computes an elliptic curve exponentiation for an elliptic curve E: $y^2=x^3+a\times x+b$ defined over a residue field F with a prime p being a modulus, including: an information obtaining unit operable to obtain a point Q that is on the elliptic curve E, and an exponent k that is a positive integer smaller than the prime p; a first storage unit operable to store therein a coefficient a that is an x term of the elliptic curve E; a computation unit operable to compute an elliptic curve exponentiation of the exponent k and the point Q using the coefficient a stored in the first storage unit, to obtain an exponentiation-result-point k*Q; a judgment unit operable to judge whether the obtained exponentiation-result-point k*Q is on the elliptic curve E; and an output unit operable to output the obtained exponentiation-result-point k*Q, when a judgment result of the judging unit is affirmative.

According to this construction, the obtained exponentiation-result-point k*Q is output only when the judgment unit judges that the exponentiation-result-point k*Q is on the elliptic curve E. Therefore, the apparatus does not output an incomplete computation result even if being subjected to the DFA.

Here, the elliptic curve exponentiation apparatus may further include a second storage unit operable to store therein a coefficient b that is a constant term of the elliptic curve E. The judgment unit may judge whether the obtained exponentiation-result-point k*Q is on the elliptic curve E, using the coefficient a stored in the first storage unit and the coefficient b stored in the second storage unit.

According to this construction, the coefficient a stored in the first storage unit and the coefficient b stored in the second storage unit are used. This ensures a correct judgment as to whether the exponentiation-result-point k*Q is on the elliptic curve E.

Here, the elliptic curve exponentiation apparatus may further include a constant term coefficient obtaining unit operable to obtain the coefficient b, and write the obtained coefficient b into the second storage unit.

According to this construction, the coefficient b that is a constant term of the elliptic curve E is obtained and is written into the second storage unit. By changing a value of the constant term coefficient b, therefore, a different elliptic curve can be set. Accordingly, an elliptic curve does not need to be fixed but various elliptic curves can be used, thereby enabling the versatility featured by elliptic curve cryptography to be maintained.

Here, the elliptic curve exponentiation apparatus may further include an x term coefficient obtaining unit operable to obtain the coefficient a, and write the obtained coefficient a into the first storage unit.

According to this construction, the coefficient a that is an x term of the elliptic curve E is obtained and is written into the first storage unit. By changing a value of the coefficient a on the x term, therefore, a different elliptic curve can be set. Accordingly, an elliptic curve does not need to be fixed but various elliptic curves can be used in the same manner as that described above.

Here, the elliptic curve exponentiation apparatus may further include a constant term coefficient computation unit operable to compute the coefficient b, using the coefficient a stored in the first storage unit, the obtained point Q, and the elliptic curve E: $y^2=x^3+a \times x+b$, and write the computed coefficient b into the second storage unit.

According to this construction, even when the coefficient b is not prestored, the coefficient b can be computed using the coefficient a, the point Q, and the elliptic curve E: $y^2=x^3+a \times x+b$, and the computed coefficient b can be used in the judgment. Therefore, there would be no such cases where a third party steals the coefficient b prior to the computation of the elliptic curve exponentiation.

Here, the computation unit may compute coordinates (Qx, Qy) as the exponentiation-result-point k*Q, and the judgment unit may compute $(Qy)^2$ and $(Qx)^3+a \times Qx+b$, compare a computation result of $(Qy)^2$ and a computation result of $(Qx)^3+a \times Qx+b$, and when the computation result of $(Qy)^2$ and the computation result of $(Qx)^3+a \times Qx+b$ match, judge that the exponentiation-result-point k*Q is on the elliptic curve E.

According to this construction, a correct judgment of the above is ensured by comparing $(Qy)^2$ and $(Qy)^3+a \times Qx+b$.

Here, the elliptic curve exponentiation apparatus may further include an error message output unit operable to output a message indicating that an error has occurred, when the judgment unit judges that the exponentiation-result-point k*Q is not on the elliptic curve E.

According to this construction, a message indicating that an error has occurred is output. Therefore, the occurrence of an error can be known from outside.

Here, the judgment unit may judge whether the point Q and the exponentiation-result-point k*Q are on a same elliptic curve, instead of judging whether the exponentiation-result-point k*Q is on the elliptic curve E, and the output unit may output the exponentiation-result-point k*Q when the judgment unit judges that the point Q and the exponentiation-result-point k*Q are on the same elliptic curve, instead of when the judgment unit judges that the exponentiation-result-point k*Q is on the elliptic curve E.

According to this construction, the judgment is performed as to whether the point Q and the exponentiation-result-point k*Q are on the same elliptic curve. The exponentiation-result-point k*Q is output only when the point Q and the exponentiation-result-point k*Q are judged to be on the same elliptic curve. Therefore, the apparatus does not output an incomplete computation result even if being subjected to the DFA.

Here, the information obtaining unit may obtain coordinates (Qx, Qy) as the point Q, the computation unit may compute coordinates (Qx', Qy') as the exponentiation-result-point k*Q, and the judgment unit may judge whether the point Q and the exponentiation-result-point k*Q are on the same elliptic curve, by judging whether $(Qy^2-Qx^3-a \times Qx)-(Qy'^2-Qx'^3-a \times Qx')=0$.

According to this construction, a correct judgment as to whether the point Q and the exponentiation-result-point k*Q are on the same elliptic curve is ensured by judging whether $(Qy^2-Qx^3-a \times Qx)-(Qy'^2-Qx'^3-a \times Qx')=0$.

The object of the present invention can also be achieved by an information security apparatus that ensures secure handling of predetermined information by computing an elliptic curve exponentiation of k*Q, based on computational complexity of solving a discrete logarithm problem on an elliptic curve E: $y^2=x^3+a \times x+b$ defined over a residue field F with a prime p being a modulus, including: an information obtaining unit operable to obtain a point Q that is on the elliptic curve E, and an exponent k that is a positive integer smaller than the prime p; a first storage unit operable to store therein a coefficient a that is an x term of the elliptic curve E; a computation unit operable to compute an elliptic curve exponentiation of the exponent k and the point Q using the coefficient a stored in the first storage unit, to obtain an exponentiation-result-point k*Q; a judgment unit operable to judge whether the obtained exponentiation-result-point k*Q is on the elliptic curve E; and a prohibition unit operable to prohibit an output of the obtained exponentiation-result-point k*Q, when a judgment result of the judging unit is negative.

According to this construction, the information security apparatus outputs the exponentiation-result-point k*Q only when the judgment unit judges that the exponentiation-result-point k*Q is on the elliptic curve E. Therefore, the apparatus does not output an incomplete computation result even if being subjected to the DFA.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 6 is a block diagram showing the construction of an elliptic curve computation unit 112a;

FIG. 7 is a flowchart showing the operation of computation of an exponentiation performed by the elliptic curve computation unit 112a;

FIG. 11 is a flowchart showing the operation of key sharing using an elliptic curve cryptography technique.

DESCRIPTION OF THE PREFERRED EMBODIMENTS

1. First Embodiment

The following describes a point issuing system 10 as a first embodiment of the present invention.

1.1 Construction of the Point Issuing System 10

Figure 1:
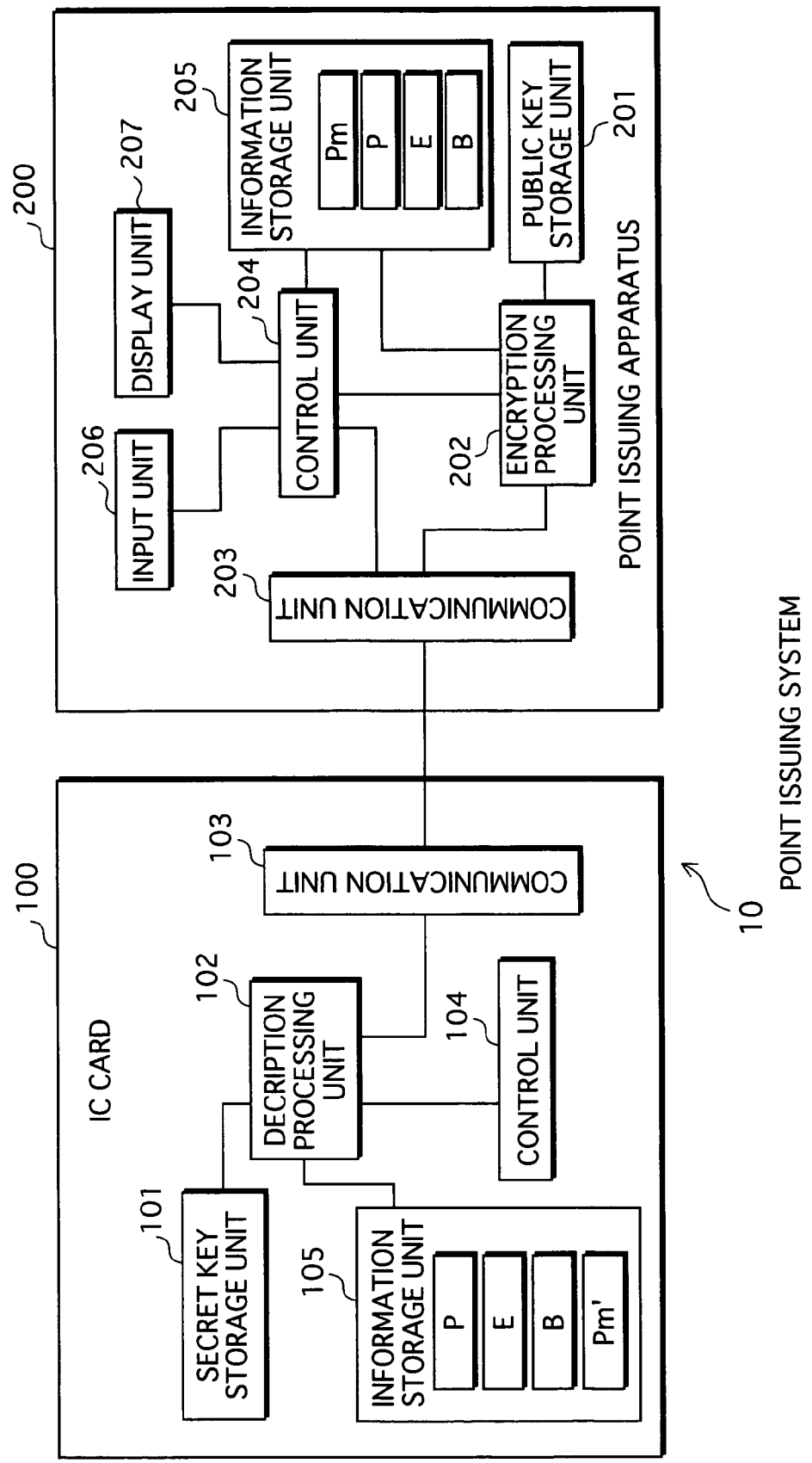
FIG. 1 is a block diagram showing the construction of a point issuing system 10.

The point issuing system 10 is roughly composed of an IC card 100 and a point issuing apparatus 200 as shown in FIG. 1.

The IC card 100 is loaded in the point issuing apparatus 200 by the user of the point issuing apparatus 200, so that the point issuing apparatus 200 generates points, encrypts the generated points, and transmits the encrypted points to the IC card 100. Here, the points are "bonus information" provided from the seller or the service provider to the user when the user purchases a commodity or uses service. For next commodity purchase or service use, the user can use the points as part of all of its payment to the seller or the service provider.

The IC card 100 receives the encrypted points, decrypts the encrypted points to obtain decrypted points, and internally stores the decrypted points.

1.2 Construction of the Point Issuing Apparatus 200

The point issuing apparatus 200 is roughly composed of a public key storage unit 201, an encryption processing unit 202, a communication unit 203, a control unit 204, an information storage unit 205, an input unit 206, and a display unit 207 as shown in FIG. 1.

The point issuing apparatus 200 is not only an apparatus for generating points, encrypting the points and writing the encrypted points to the IC card 100, but also serves as a cash register used for a commodity sale. To be specific, the point issuing apparatus 200 performs such operations as calculation of a sales amount, displaying of the sales amount, printing of a receipt, internal storing of the generated points, and keeping of money paid by the user.

The point issuing apparatus 200 specifically is a computer system including a microprocessor, a ROM, a RAM, a hard disk unit, a display unit, and a keyboard. A computer program is stored in the RAM or the hard disk unit. The functions of the point issuing apparatus 200 are realized by the microprocessor operating in accordance with the computer program.

(1) Information Storage Unit 205 and Public Key Storage Unit 201

The information storage unit 205 stores a base point B on an elliptic curve E(Fp) defined over a residue field Fp with a prime p being a modulus, the prime, and the elliptic curve E(Fp). Also, the information storage unit 205 has an area for storing the generated points Pm.

The public key storage unit 201 stores a public key kp generated in correspondence with a secret key ks described later. Here, the public key kp is obtained by the IC card 100 or the key management apparatus using the equation;

public key $kp$=secret key $ks$*base point $B$.

(2) Control Unit 204

The control unit 204 generates points Pm as the bonus information, and writes the generated points Pm to the information storage unit 205. The control unit 204 then outputs an instruction to the encryption processing unit 202, to encrypt the points Pm and transmit the encrypted points Pm to the IC card 100.

(3) Encryption Processing Unit 202

Figure 2:
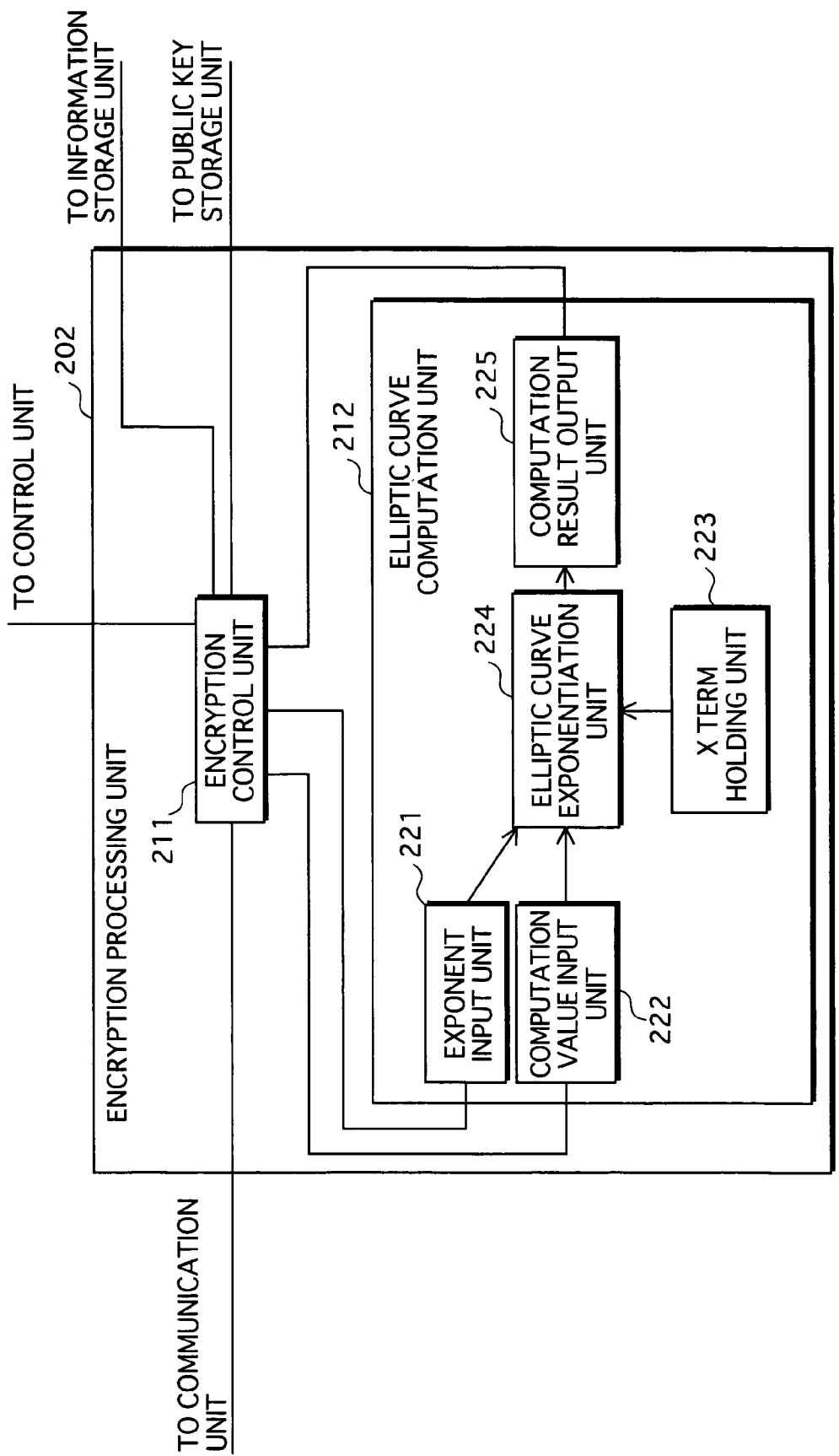
FIG. 2 is a block diagram showing the construction of an encryption processing unit 202.

The encryption processing unit 202 is roughly composed of an encryption control unit 211 and an elliptic curve computation unit 212 as shown in FIG. 2. The elliptic curve computation unit 212 includes an exponent input unit 221, a computation value input unit 222, an x term holding unit 223, an elliptic curve exponentiation unit 224, and a computation result output unit 225.

(Encryption Control Unit 211)

The encryption control unit 211 receives, from the control unit 204, an instruction to encrypt the points Pm and transmit the encrypted points Pm to the IC card 100.

Upon receipt of the instruction, the encryption control unit 211 generates a random number r, and reads the base point B from the information storage unit 205. The encryption control unit 211 then outputs, as an exponent, the generated random number r to the exponent input unit 221, and outputs, as a computation value, the read base point B to the computation value input unit 222. Following this, the encryption control unit 211 receives, as a computation result, an exponentiation-result-point r*B from the computation result output unit 225, and sets a first ciphertext s1=the exponentiation-result-point r*B.

Following this, the encryption control unit 211 reads the public key kp from the public key storage unit 201. The encryption control unit 211 then outputs, as an exponent, the generated random number r to the exponent input unit 221, and outputs, as a computation value, the read public key kp to the computation value input unit 222. The encryption control unit 211 receives, as a computation result, the exponentiation-result-point r*kp from the computation result output unit 225.

The encryption control unit 211 reads the points Pm from the information storage unit 205, takes the exclusive-or of the read points Pm and X-coordinate of the received exponentiation-result-point r*kp, to generate a second ciphertext s2=the points Pm XOR (X-coordinate of the exponentiation-result-point r*kp), where "XOR" is an operator indicating an exclusive-or.

The encryption control unit 211 then transmits the first ciphertext s1 and the second ciphertext s2 to the IC card 100 via the communication unit 203.

(Exponent Input Unit 221)

The exponent input unit 221 receives the exponent from the encryption control unit 211, and outputs the received exponent to the elliptic curve exponentiation unit 224.

(Computation Value Input Unit 222)

The computation value input unit 222 receives the computation value from the encryption control unit 211, and outputs the received computation value to the elliptic curve exponentiation unit 224.

(X Term Holding Unit 223)

The x term holding unit 223 holds a coefficient a, which is an x term of the elliptic curve E(Fp): $y^2=x^3+a \times x+b$. As one example, the coefficient a may be −3.

(Elliptic Curve Exponentiation Unit 224)

The elliptic curve exponentiation unit 224 receives the exponent from the exponent input unit 221, the computation value from the computation value input unit 222, and the coefficient a from the x term holding unit 223.

Following this, the elliptic curve exponentiation unit 224 computes (exponent)*(computation value), and outputs, as a computation result, its exponentiation-result-point to the computation result output unit 225.

It should be noted here that the computation of an exponentiation is described later.

(Computation Result Output Unit 225)

The computation result output unit 225 receives the exponentiation-result-point from the elliptic curve exponentiation unit 224, and outputs the received exponentiation-result-point to the encryption control unit 211.

(4) Communication Unit 203, Input Unit 206, and Display Unit 207

The communication unit 203 transmits and receives information to and from the IC card 100, based on control provided by the encryption processing unit 202 or the control unit 204.

The input unit 206 receives an input of information or an instruction from the user of the point issuing apparatus 200, and outputs the received information or instruction to the control unit 204.

The display unit 207 displays various types of information based on control provided by the control unit 204.

1.3 Construction of the IC Card 100

The IC card 100 is roughly composed of a secret key storage unit 101, a decryption processing unit 102, a communication unit 103, a control unit 104, and an information storage unit 105 as shown in FIG. 1.

The IC card 100 specifically is a computer system including a microprocessor, a ROM, and a RAM. A computer program is stored in the RAM. The functions of the IC card 100 are realized by the microprocessor operating in accordance with the computer program.

(1) Information Storage Unit 105 and Secret key Storage Unit 101

The information storage unit 105 stores the prime p, the elliptic curve E(Fp), and the base point B. Also, the information storage unit 105 has an area for storing the decrypted points Pm'.

The secret key storage unit 101 stores the secret key ks.

(2) Communication Unit 103

The communication unit 103 receives the first ciphertext s1 and the second ciphertext s2 from the point issuing apparatus 200. Upon receipt of the first ciphertext s1 and the second ciphertext s2, the communication unit 103 gives a notification of the reception to the control unit 104. The communication unit 103 outputs the ciphertext s1 and the ciphertext s2 received, to the decryption processing unit 102.

(3) Control Unit 104

The control unit 104 receives the notification of the reception of the first ciphertext s1 and the second ciphertext s2 from the communication unit 103. Upon receipt of the notification, the control unit 104 outputs, to the decryption processing unit 102, an instruction to decrypt the first ciphertext s1 and the second ciphertext s2 to obtain decrypted points.

(4) Decryption Processing Unit 102

Figure 3:
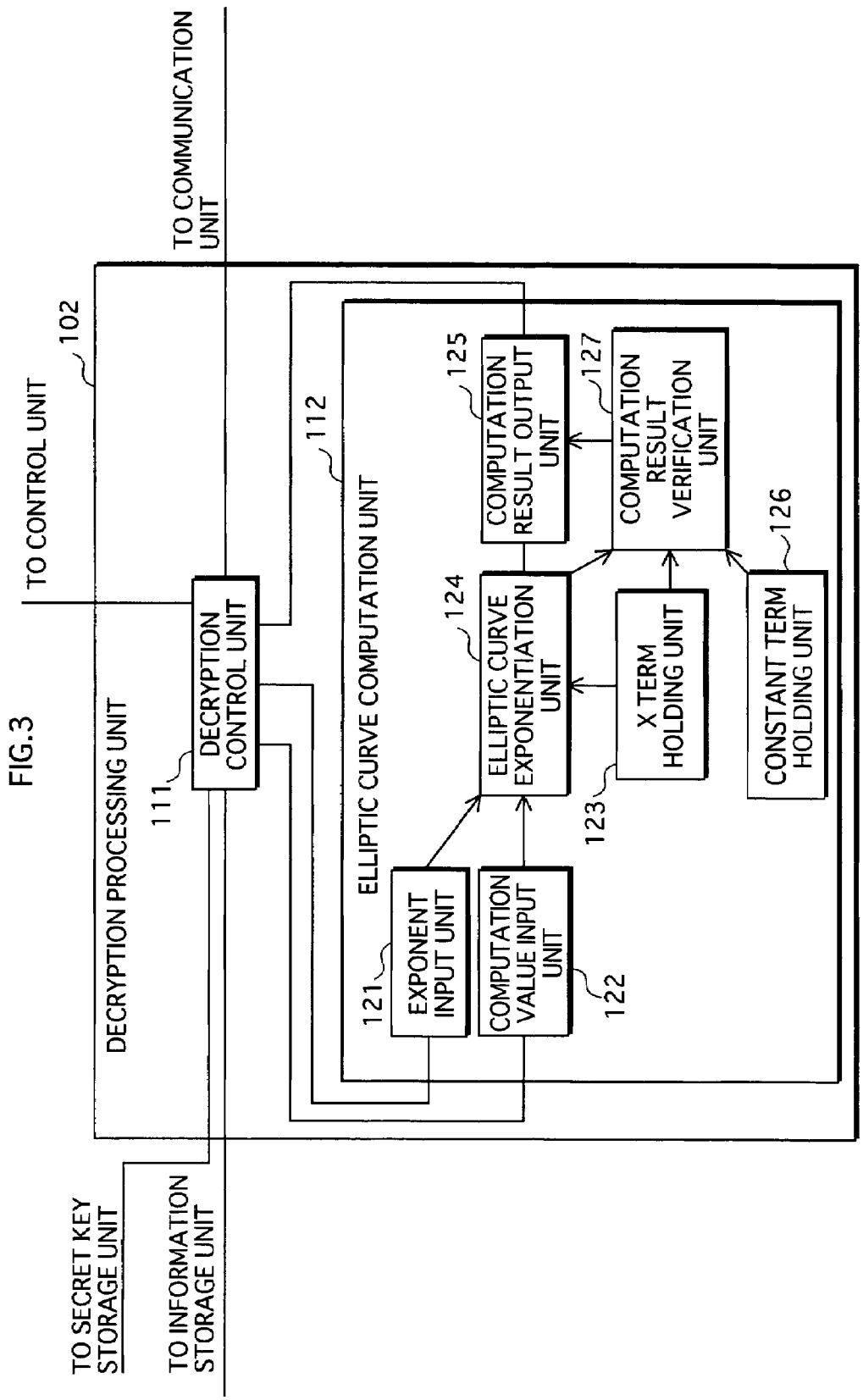
FIG. 3 is a block diagram showing the construction of a decryption processing unit 102.

As shown in FIG. 3, the decryption processing unit 102 is roughly composed of a decryption control unit 111 and an elliptic curve computation unit 112. The elliptic curve computation unit 112 is roughly composed of an exponent input unit 121, a computation value input unit 122, a primary expressing holding unit 123, an elliptic curve exponentiation unit 124, a computation result output unit 125, a constant term holding unit 126, and a computation result verification unit 127.

(Decryption Control Unit 111)

The decryption control unit 111 receives, from the control unit 104, an instruction to decrypt the first ciphertext s1 and the second ciphertext s2, to obtain decrypted points. Also, the decryption control unit 111 receives the first ciphertext s1 and the second ciphertext s2 from the communication unit 103.

Upon receipt of the instruction, the decryption control unit 111 reads the secret key ks from the secret key storage unit 101. Following this, the decryption control unit 111 outputs, as a computation value, the received first ciphertext s1 to the computation value input unit 122, and outputs, as an exponent, the read secret key ks to the exponent input unit 121. The decryption control unit 111 receives error occurrence information indicating whether an error has occurred, from the computation result output unit 125. When the received error occurrence information indicates that an error has occurred, the decryption control unit 111 aborts the subsequent decryption processing. When the received error occurrence information indicates that an error has not occurred, the decryption control unit 111 receives the computation result ks*s1, and further, computes the decrypted points Pm'=the second ciphertext s2 XOR (X-coordinate of the computation result ks*s1), where Pm'=s2 XOR (X-coordinate of ks*s1)=(Pm XOR (X-coordinate of r*kp)) XOR (X-coordinate of ks−r*B)=Pm XOR (X-coordinate of r·ks*B) XOR (X-coordinate of r·ks*B)=Pm.

As can be seen from this, the decrypted points Pm' match the points Pm.

Following this, the decryption control unit 111 writes the decrypted points Pm' to the information storage unit 105.

(Exponent Input Unit 121)

The exponent input unit 121 receives the exponent k from the decryption control unit 111, and outputs the received exponent k to the elliptic curve exponentiation unit 124.

(Computation Value Input Unit 122)

The computation value input unit 122 receives the computation value Q from the decryption control unit 111, and outputs the received computation value Q to the elliptic curve exponentiation unit 124.

(X Term Holding Unit 123)

The x term holding unit 123 holds the coefficient a, which is an x term of the elliptic curve E(Fp): $y^2=x^3+a \times x+b$. As one example, the coefficient a may be −3.

(Elliptic Curve Exponentiation Unit 124)

The elliptic curve exponentiation unit 124 receives the exponent k from the exponent input unit 121, the computation value Q from the computation value input unit 222, and the coefficient a from the x term holding unit 123.

Following this, the elliptic curve exponentiation unit 124 computes (exponentk)*(computation value Q), and outputs, as a computation result, its exponentiation-result-point=(X, Y) to the computation result verification unit 127.

(Constant Term Holding Unit 126)

The constant term holding unit 126 holds the coefficient b, which is a constant term of the elliptic curve E(Fp): $y^2=x^3+a \times x+b$.

(Computation Result Verification Unit 127)

The computation result verification unit 127 receives, as a computation result of (exponent k)*(computation value Q), the exponentiation-result-point=(X,Y) from the elliptic curve exponentiation unit 124, receives the coefficient a from the x term holding unit 123, and receives the coefficient b from the constant term holding unit 126.

The computation result verification unit 127 computes $X^3+a\times x+b$ using the received X, computes $Y^2$ using the received Y, and judges whether $Y^2=X^3+a\times X+b$.

When judging that $Y^2=X^3+a\times X+b$, the computation result verification unit 127 outputs error occurrence information indicating that an error has not occurred, together with the received exponentiation-result-point, to the computation result output unit 125.

When not judging that $Y^2=X^3+a\times X+b$, the computation result verification unit 127 outputs error occurrence information indicating that an error has occurred, to the computation result output unit 125.

(Computation Result Output Unit 125)

The computation result output unit 125 receives the error occurrence information from the elliptic curve exponentiation unit 124, and outputs the received error occurrence information to the decryption control unit 111. Also, the computation result output unit 125 receives the exponentiation-result-point from the elliptic curve exponentiation unit 124, and outputs the received exponentiation-result-point to the decryption control unit 111.

1.4 Operation of the Point Issuing System 10

Figure 4:
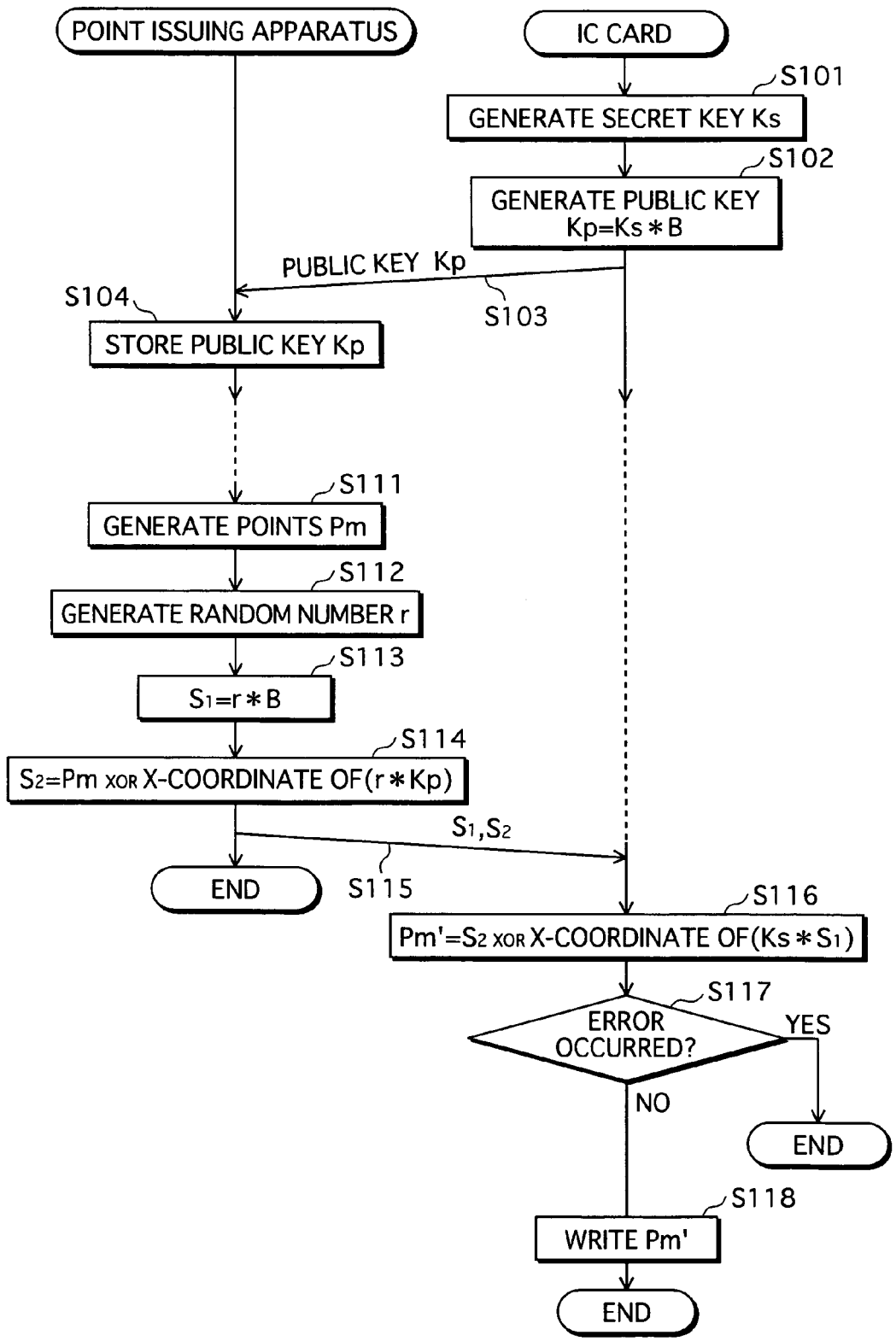
FIG. 4 is a flowchart showing the operation of the point issuing system 10.

The following describes the operation of the point issuing system 10, with reference to a flowchart shown in FIG. 4.

(1) Operation for Generating Secret key ks and Public Key kp

The following describes the operation performed prior to issuing of points by the point issuing apparatus 200.

The decryption processing unit 102 of the IC card 100 generates the secret key ks, and writes the generated secret key ks to the secret key storage unit 101 (step S101). Following this, the decryption processing unit 102 reads the base point B from the information storage unit 105, and computes an elliptic curve exponentiation of the generated secret key ks and the read base point B, to generate the public key kp=ks*B. Here, the computation of the elliptic curve exponentiation is performed by the elliptic curve exponentiation unit 124 (step S102). The decryption processing unit 102 then transmits the generated public key kp to the point issuing apparatus 200 via the communication unit 103 (step S103).

The encryption processing unit 202 of the point issuing apparatus 200 receives the public key kp from the IC card 100 via the communication unit 203, and writes the received public key kp to the public key storage unit 201 (step S104).

Here, although the IC card 100 generates the secret key ks, generates the public key kp based on the generated secret key ks, and transmits the generated public key kp to the point issuing apparatus 200, this may be modified as follows.

The IC card 100 may generate the secret key ks, and internally store the generated secret key ks. The key management apparatus then may obtain the secret key ks from the IC card 100, generate the public key kp using the obtained secret key ks in the same manner as that described above, and transmit the generated public key kp to the point issuing apparatus 200.

(2) Operation for Issuing Points

The control unit 204 of the point issuing apparatus 200 generates the points Pm, writes the generated points Pm to the information storage unit 205, and outputs, to the encryption processing unit 202, an instruction to encrypt the points Pm and transmit the encrypted points Pm to the IC card 100 (S111).

Upon receipt of the instruction, the encryption control unit 211 generates the random number r (step S112). The encryption control unit 211 reads the base point B from the information storage unit 205, and outputs, as an exponent, the generated random number r to the exponent input unit 221, and outputs, as a computation value, the read base point B to the computation value input unit 222. The encryption control unit 211 receives, as a computation result, the exponentiation-result-point r*B from the computation result output unit 225, and sets the first ciphertext s1=the exponentiation-result-point r*B (step S113).

Following this, the encryption control unit 211 reads the public key kp from the public key storage unit 201, outputs, as an exponent, the generated random number r to the exponent input unit 221, and outputs, as a computation value, the read public key kp to the computation value input unit 222. The encryption control unit 211 receives, as a computation result, the exponentiation-result-point r*kp from the computation result output unit 225. The encryption control unit 211 then reads the points Pm from the information storage unit 205, takes the XOR of the read points Pm and X-coordinate of the received exponentiation-result-point r*kp, to generate the second ciphertext s2=the points Pm XOR (X-coordinate of the exponentiation-result-point r*kp) (step S114).

Following this, the encryption control unit 211 transmits the first ciphertext s1 and the second ciphertext s2 to the IC card 100 via the communication unit 203 (step S115).

The decryption control unit 111 receives the first ciphertext s1 and the second ciphertext s2 from the point issuing apparatus 200 via the communication unit 103 (step S115).

The decryption control unit 111 then reads the secret key ks from the secret key storage unit 101, outputs, as a computation value, the received first ciphertext s1 to the computation value input unit 122, and outputs, as an exponent, the read secret key ks to the exponent input unit 121. The elliptic curve exponentiation unit 124 computes ks*s1. The decryption control unit 111 then receives error occurrence information and a computation result of ks*s1 from the computation result output unit 125, and computes the decrypted points Pm'=the second ciphertext s2 XOR (X-coordinate of the computation result ks*s1) (step S116).

When the received error occurrence information indicates that an error has occurred (step S117), the decryption control unit 111 ends the processing. When the received error occurrence information indicates that an error has not occurred (step S117), the decryption control unit 111 writes the decrypted points Pm' obtained by the computation, to the information storage unit 105 (step S118).

(3) Operation for Computation of Elliptic Curve Exponentiation

Figure 5:
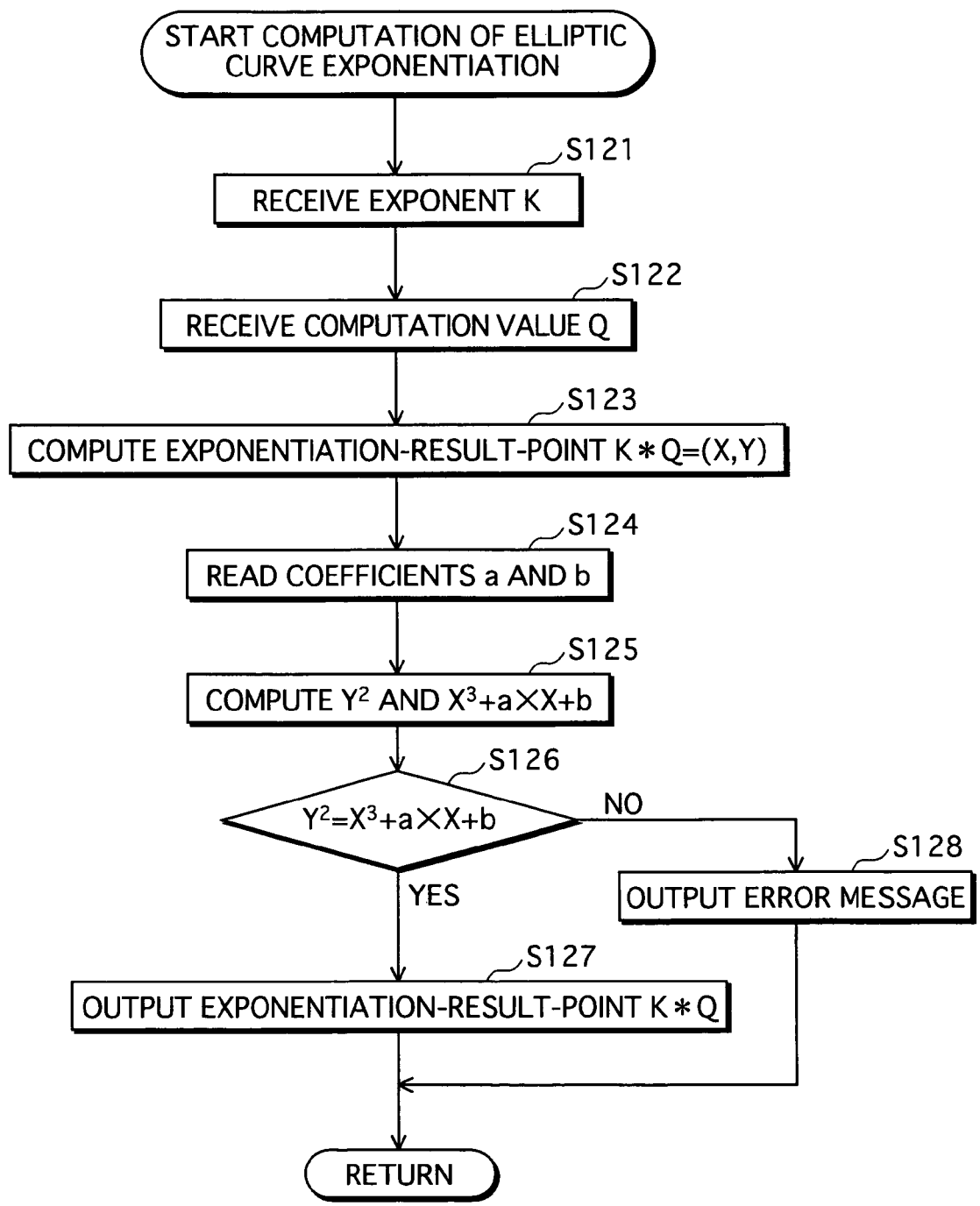
FIG. 5 is a flowchart showing the operation of computation of an exponentiation performed by an elliptic curve computation unit 112.

The following describes the operation for computation of an elliptic curve exponentiation by the elliptic curve computation unit 112 of the IC card 100, with reference to a flowchart shown in FIG. 5.

The exponent input unit 121 receives the exponent k from the decryption control unit 111, and outputs the received exponent k to the elliptic curve exponentiation unit 124 (step S121). The computation value input unit 122 receives the computation value Q from the decryption control unit 111, and outputs the received computation value Q to the elliptic curve exponentiation unit 124 (step S122).

Following this, the elliptic curve exponentiation unit 124 receives the exponent k from the exponent input unit 121, the computation value Q from the computation value input unit 122, and the coefficient a from the x term holding unit 123. The elliptic curve exponentiation unit 124 then computes (exponent k)*(computation value Q), and outputs, as a computation result, the exponentiation-result-point=(X, Y) to the computation result verification unit 127 (step S123).

The computation result verification unit 127 receives the coefficient a from the x term holding unit 123, and the coefficient b from the constant term holding unit 126 (step S124). The computation result verification unit 127 then computes $X^3+a \times X+b$, and computes $Y^2$ (step S125), and judges whether $Y^2=X^3+a \times X+b$ (step S126).

When judging that $Y^2=X^3+a \times X+b$ (step S126), the computation result verification unit 127 outputs error occurrence information indicating that an error has not occurred, together with the received exponentiation-result-point, to the computation result output unit 125. The computation result output unit 125 outputs the error occurrence information and the exponentiation-result-point to the decryption control unit 111 (step S127).

When not judging that $Y^2=X^3+a \times X+b$ (step S126), the computation result verification unit 127 outputs error occurrence information indicating that an error has occurred, to the computation result output unit 125. The computation result output unit 125 outputs the error occurrence information to the decryption control unit 111 (step S128).

2. Modification (1)

The following describes a point issuing system 10*a* (not shown) as a modification of the point issuing system 10.

2.1 Construction of the Point Issuing System 10*a*

The point issuing system 10*a* has the same construction as the point issuing system 10 except the following.

The point issuing system 10*a* includes an IC card 10*a* (not shown) instead of the IC card 100. The IC card 100*a* includes a decryption processing unit 102*a* (not shown) instead of the decryption processing unit 102. The decryption processing unit 102*a* includes an elliptic curve computation unit 112*a* instead of the elliptic curve computation unit 112.

Figure 6:
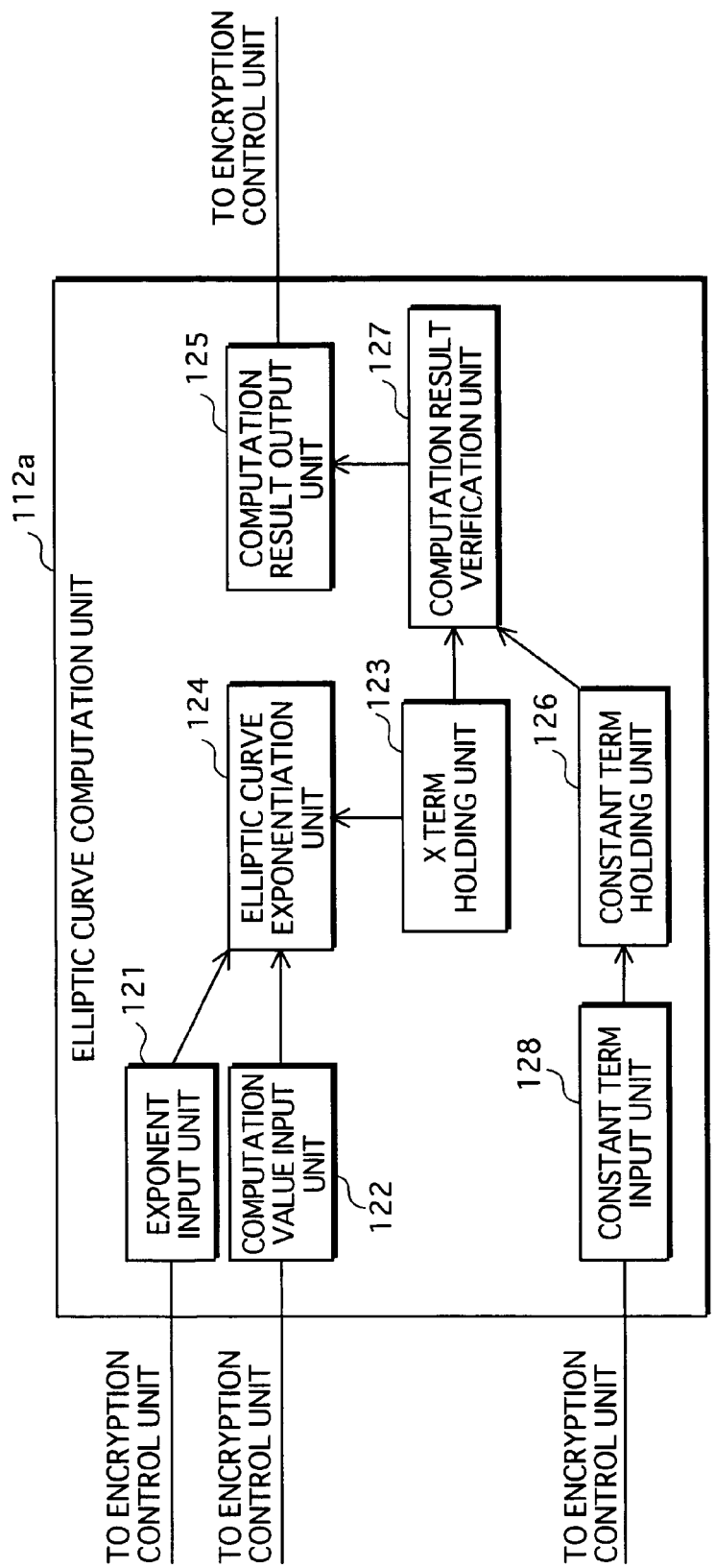

The elliptic curve computation unit 112*a* is roughly composed of an exponent input unit 121, a computation value input unit 122, an x term holding unit 123, an elliptic curve exponentiation unit 124, a computation result output unit 125, a constant term holding unit 126, a computation result verification unit 127, and a constant term input unit 128 as shown in FIG. 6.

The following describes the point issuing system 10*a*, focusing on its differences from the components of the point issuing system 10.

(Information Storage Unit 105)

The information storage unit 105 prestores the coefficient b, which is a constant term of the elliptic curve E(Fp): $y^2=x^3+a \times x+b$.

(Decryption Control Unit 111)

The decryption control unit 111 reads the coefficient b, which is a constant term, from the information storage unit 105 when the elliptic curve computation unit 112*a* performs computation of an exponentiation, and outputs the read coefficient b to the constant term input unit 128 of the elliptic curve computation unit 112*a*.

(Constant Term Holding Unit 126)

The constant term holding unit 126 has an area for holding the coefficient b, which is a constant term of the elliptic curve E(Fp): $Y^2=X^3+a \times x+b$.

(Constant Term Input Unit 128)

The constant term input unit 128 receives the coefficient b from the decryption control unit 111, and writes the received coefficient b to the constant term holding unit 126.

2.2 Operation of the Point Issuing System 10*a*

Figure 7:
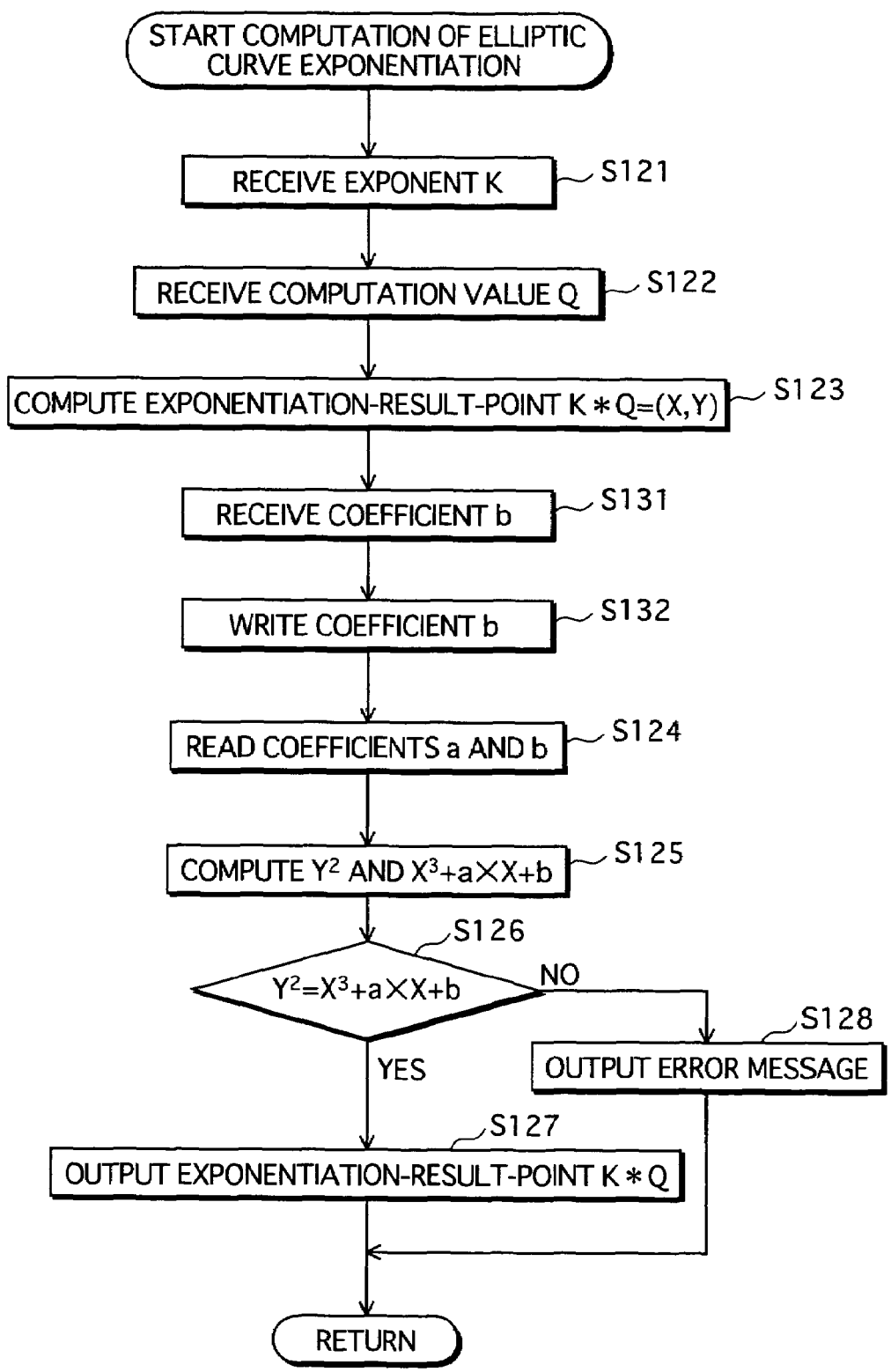

The operation of the point issuing system 10*a* is the same as the operation of the point issuing system 10 except its operation part relating to computation of an elliptic curve exponentiation. Therefore, the following describes the operation of the elliptic curve computation unit 112*a* for the computation of an elliptic curve exponentiation, with reference to a flowchart shown in FIG. 7. Further, the operation for the computation of an elliptic curve exponentiation by the elliptic curve computation unit 112*a* is similar to the corresponding operation by the elliptic curve computation unit 112 shown in FIG. 5. Therefore, the following describes such an operation, focusing on its differences from the operation shown in FIG. 5.

Following step S123, the constant term input unit 128 receives the coefficient b from the decryption control unit 111 (step S131), and writes the received coefficient b to the constant term holding unit 126 (step S132). The processing advances to step S124 and subsequent steps.

3. Modification (2)

The following describes a point issuing system 10*b* (not shown) as another modification of the point issuing system 10.

3.1 Construction of the Point Issuing System 10*b*

The point issuing system 10*b* has the same construction as the point issuing system 10 except the following.

The point issuing system 10*b* includes an IC card 100*b* (not shown) instead of the IC card 100. The IC card 100*b* includes a decryption processing unit 102*b* (not shown) instead of the decryption processing unit 102. The decryption processing unit 102*b* includes an elliptic curve computation unit 112*b* instead of the elliptic curve computation unit 112.

Figure 8:
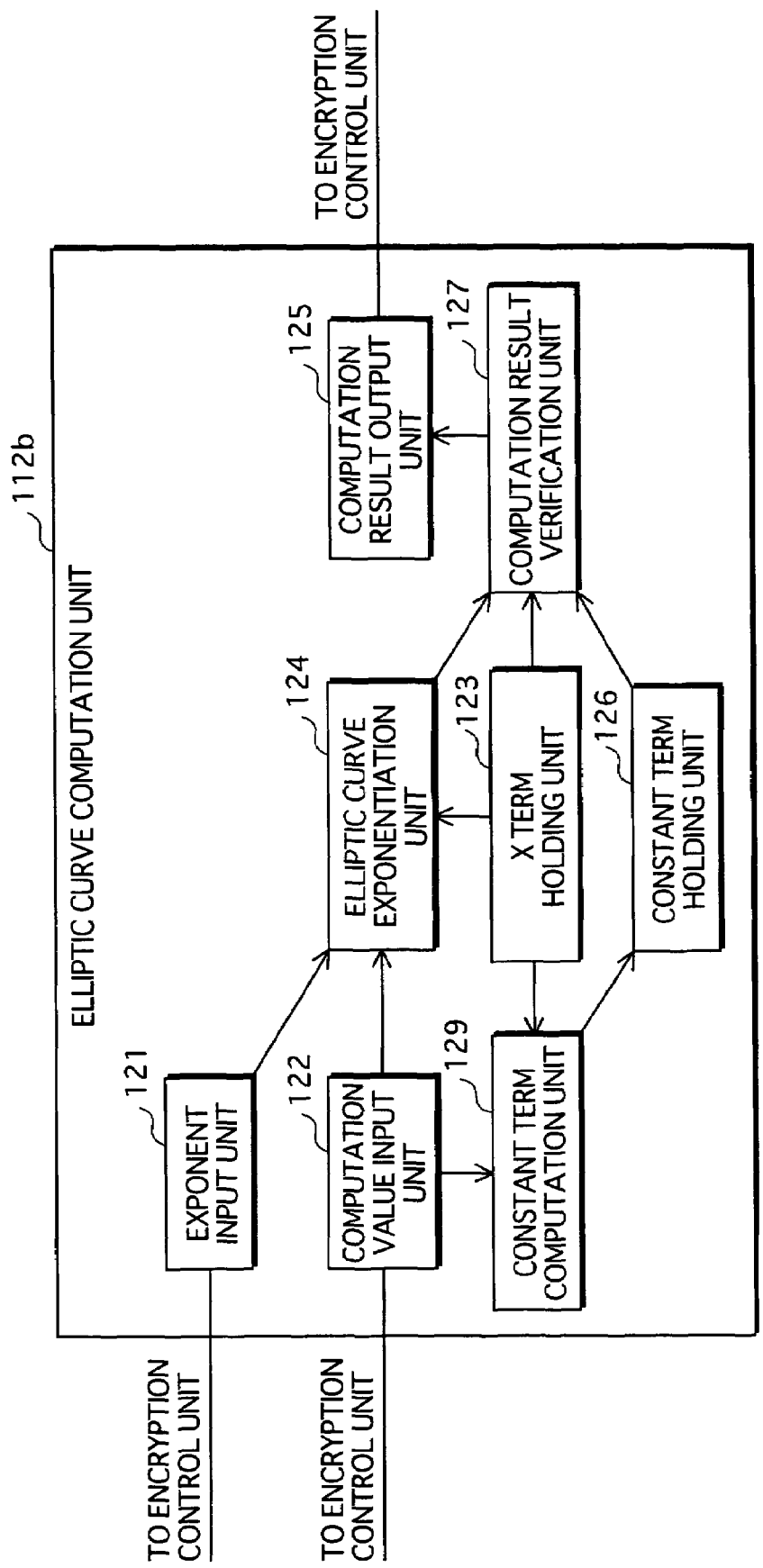
FIG. 8 is a block diagram showing the construction of an elliptic curve computation unit 112b.

The elliptic curve computation unit 112*b* is roughly composed of an exponent input unit 121, a computation value input unit 122, an x term holding unit 123, an elliptic curve exponentiation unit 124, a computation result output unit 125, a constant term holding unit 126, a computation result verification unit 127, and a constant term computation unit 129 as shown in FIG. 8.

The following describes the point issuing system 10*a*, focusing on its differences from the components of the point issuing system 10.

(Computation Value Input Unit 122)

The computation value input unit 122 outputs the received exponentiation-result-point Q=(X, Y), to the constant term computation unit 129.

(Constant Term Computation Unit 129)

The constant term computation unit 129 receives the exponentiation-result-point Q=(X, Y) from the computation value input unit 122, and reads the coefficient a from the x term holding unit 123. The constant term computation unit 129 then computes the coefficient b using the exponentiation-result-point Q=(X, Y) and the coefficient a, such that the coefficient $b=Y^2-X^3-a \times X$.

Following this, the constant term computation unit 129 writes the computed coefficient b to the constant term holding unit 126.

(Constant Term Holding Unit 126)

The constant term holding unit 126 has an area for holding the coefficient b, which is a constant term of the elliptic curve E(Fp): $Y^2 = X^3 + a \times x + b$.

3.2 Operation of the Point Issuing System 10b

Figure 9:
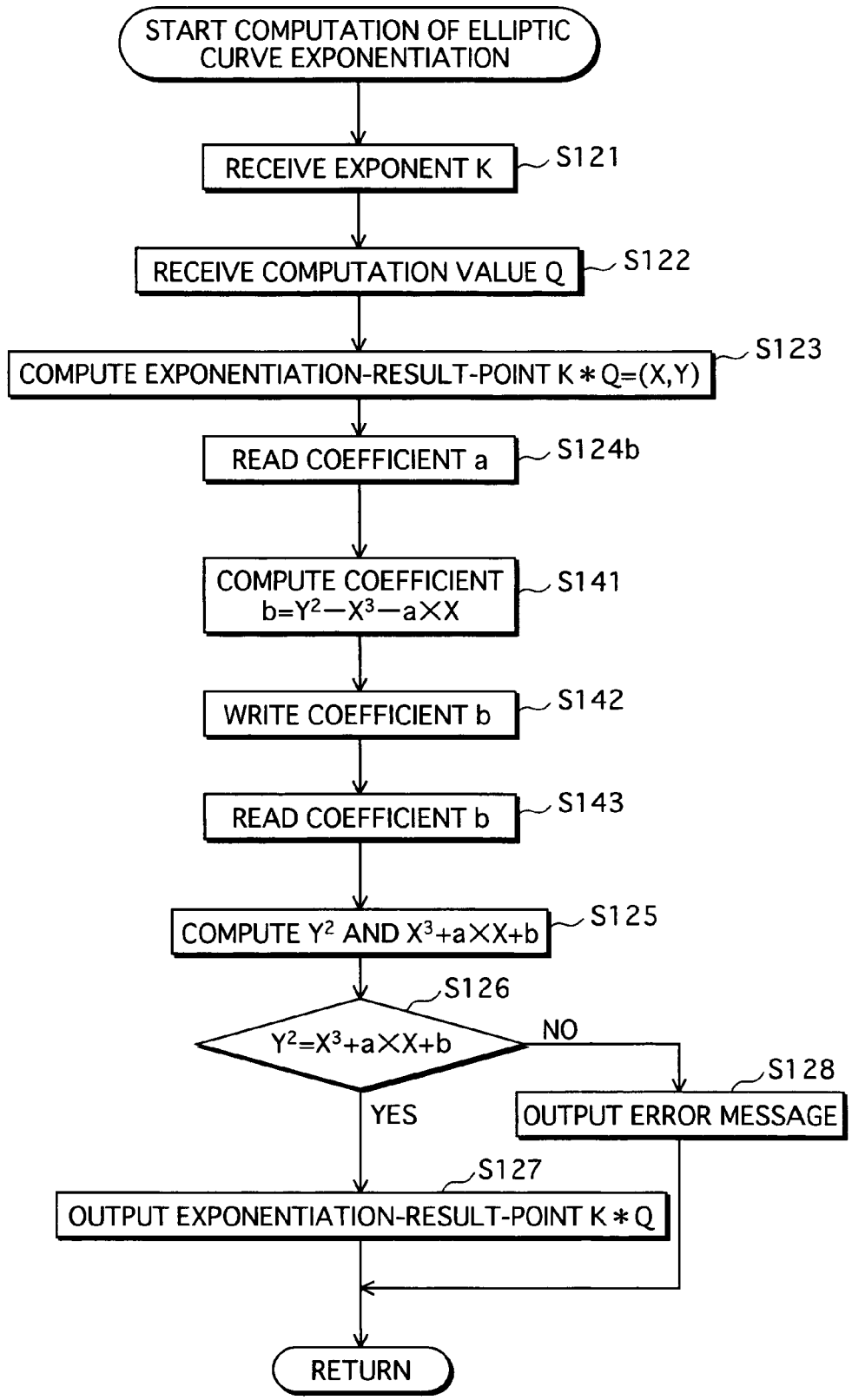
FIG. 9 is a flowchart showing the operation of computation of an exponentiation performed by the elliptic curve computation unit 112b.

The operation of the point issuing system 10b is the same as the operation of the point issuing system 10 except its operation part relating to computation of an elliptic curve exponentiation. Therefore, the following describes the operation of the elliptic curve computation unit 112b for the computation of an elliptic curve exponentiation, with reference to a flowchart shown in FIG. 9. Further, the operation for the computation of an elliptic curve exponentiation by the elliptic curve computation unit 112b is similar to the corresponding operation by the elliptic curve computation unit 112 shown in FIG. 5. Therefore, the following describes such an operation, focusing on its differences from the operation shown in FIG. 5.

Following step S123, step S124b is provided instead of step S124. The computation result verification unit 127 receives the coefficient a from the x term holding unit 123 (step S124b).

The constant term computation unit 129 then receives the computation value Q=(X, Y) from the computation value input unit 122, and reads the coefficient a from the x term holding unit 123. Using the computation value Q=(X, Y) and the coefficient a, the constant term computation unit 129 computes $b = Y^2 - X^3 - a \times X$ (step S141). The constant term computation unit 129 then writes the computed coefficient b to the constant term holding unit 126 (step S142).

Following this, the computation result verification unit 127 receives the coefficient b from the constant term holding unit 126 (step S143). The processing then advances to step S125 and subsequent steps.

4. Second Embodiment

The following describes a digital signature system (not shown) as a second embodiment of the present invention.

The digital signature system is roughly composed of a user A apparatus, a user B apparatus, and a management center apparatus (all not shown). The user A apparatus, the user B apparatus, and the management center apparatus are connected to one another via the Internet. The user A apparatus, the user B apparatus, and the management center apparatus are each specifically a computer system including a microprocessor, a ROM, a RAM, a hard disk unit, a display unit, a keyboard, and a mouse. A computer program is stored in the RAM or the hard disk unit. The functions of each of the user A apparatus, the user B apparatus, and the management center apparatus are realized by the microprocessor operating in accordance with the computer program.

The user A apparatus sends a message, together with digital signature data, to the user B apparatus. The user B apparatus receives the message together with the digital signature data, and performs signature verification using the received digital signature data.

The user A apparatus, the user B apparatus, and the management center apparatus each include an elliptic curve computation unit that is the same as the elliptic curve computation unit 112 described above. With the use of this elliptic curve computation unit, the user A apparatus, the user B apparatus, and the management center apparatus each perform computation of an elliptic curve exponentiation, which is described below. It should be noted here that the elliptic curve computation unit included in each of the user A apparatus, the user B apparatus, and the management center apparatus may alternatively be the same as the elliptic curve computation unit 112a, or as the elliptic curve computation unit 112b.

Figure 10:
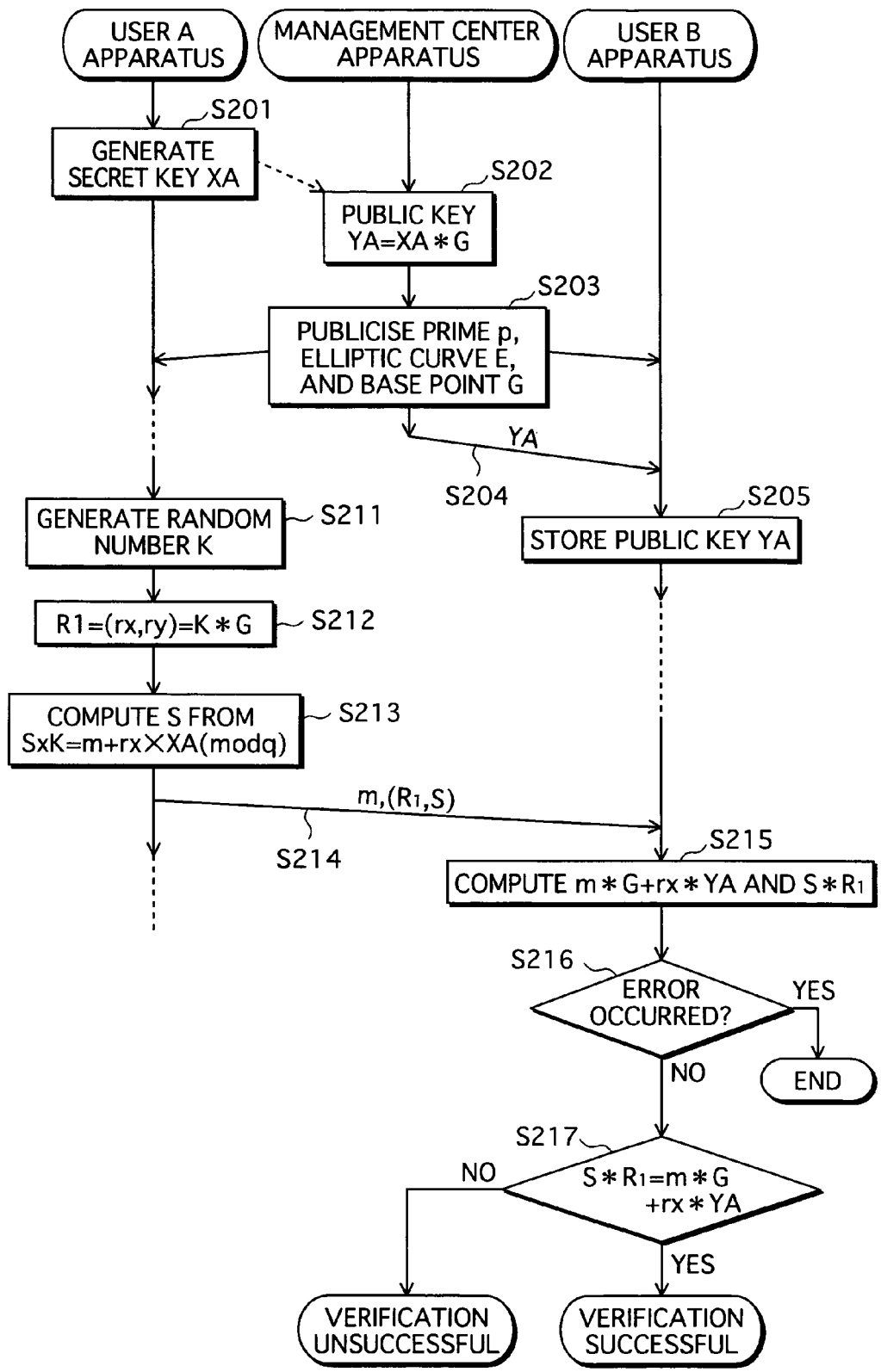
FIG. 10 is a flowchart showing the operation of digital signing using an elliptic curve cryptography technique.

The following describes the operation of the digital signature system, with reference to a flowchart shown in FIG. 10.

(Generation of Secret Key Xa and Public Key Ya)

The user A apparatus generates a secret key XA (step S201).

The management center apparatus securely obtains the secret key XA from the user A apparatus, and computes a public key YA=XA*G, using the obtained secret key XA (step S202).

Assume here that an elliptic curve E(Fp) is defined over a residue field Fp with a prime p being a modulus. Here, the order of E is q, and G is a base point on the elliptic curve E(Fp).

Following this, the management center apparatus publicizes the prime p, the elliptic curve E(Fp), and the base point G (step S203), and sends the public key YA to the user B apparatus via the Internet (step S204).

The user B apparatus obtains the prime p, the elliptic curve E(Fp), and the base point G, and receives the public key YA (step S204), and internally stores the received public key YA (step S205).

The user A apparatus also obtains the prime p, the elliptic curve E(Fp), and the base point G.

(Digital Signature Data Generation and Signature Verification)

The user A apparatus generates a random number K (step S211), generates first signature data R1=(rx, ry)=K*G (step S212), and computes second signature data S using the equation S×K=m+rx×XA(mod q) (stepS213). Here m represents a message sent from the user A apparatus to the user B apparatus.

Following this, the user A apparatus sends the obtained signature data (R1, S) and the message m, to the user B apparatus (step S214).

The user B apparatus receives the signature data (R1, S) and the message m from the user A apparatus (step S214).

The user B apparatus then computes S*R1 and m*G+rx*YA (step S215), and judges whether an error has occurred. When judging that an error has occurred (step S216), the user B apparatus ends the processing. When judging that an error has not occurred (step S216), the user B apparatus judges whether S*R1=m*G+rx*YA (step S217). When judging that S*R1=m*G+rx*YA (step S217), the user B apparatus determines that the verification is successful and the user A apparatus is valid. When not judging S*R1=m*G+rx*YA (step S217), the user B apparatus determines that the verification is unsuccessful and the user A apparatus is not valid.

5. Third Embodiment

The following describes a key sharing system (not shown) as a third embodiment of the present invention.

The key sharing system is roughly composed of a user A apparatus, a user B apparatus, and a management center apparatus (all not shown). The user A apparatus, the user B apparatus, and the management center apparatus are connected to one another via the Internet. The user A apparatus, the user B apparatus, and the management center apparatus are each specifically a computer system including a microprocessor, a ROM, and a RAM. The functions of each of the user A apparatus, the user B apparatus, and the management center apparatus are realized by the microprocessor operating in accordance with a computer program stored in the ROM or the RAM.

The user A apparatus and the user B apparatus each obtain the same shared key, without revealing the key to third parties.

The user A apparatus, the user B apparatus, and the management center apparatus each include an elliptic curve computation unit that is the same as the elliptic curve computation unit 112 described above. With the use of this elliptic curve computation unit, the user A apparatus, the user B apparatus, and the management center apparatus each perform computation of an elliptic curve exponentiation, which is described below. It should be noted here that the elliptic curve computation unit included in each of the user A apparatus, the user B apparatus, and the management center apparatus may alternatively be the same as the elliptic curve computation unit 112*a*, or as the elliptic curve computation unit 112*b*.

The following describes the operation of the key sharing system, with reference to a flowchart shown in FIG. 11.

The management center apparatus selects the elliptic curve E(Fp) and the base point G (step S311), and publicizes the prime p, the elliptic curve E(Fp), and the base point G (step S312). Assume here that the elliptic curve E(Fp) is defined over the residue field Fp with the prime p being a modulus. Here, G is a base point on the elliptic curve E(Fp).

The user A apparatus sets a secret key XA (step S301), computes a public key YA=XA*G (step S302), and sends the public key YA to the user B apparatus (step S303).

On the other hand, the user B apparatus sets a secret key XB (step S321), computes a public key YB=XB*G (step S322), and sends the public key YB to the user A apparatus (step S323).

The user A apparatus computes a shared key XA*YB= (XA×XB)*G (step S304).

On the other hand, the user B apparatus computes a shared key XB*YA=(XB×XA)*G (step S324).

$$\text{Here, the shared key } XB*YA = (XB \times XA)*G$$
$$= (XA \times XB)*G$$
$$= \text{the shared key } XA*YB.$$

6. Computation of Elliptic Curve Exponentiation

The following briefly describes the computation of an elliptic curve exponentiation.

As one example, the following describes computation of an elliptic curve exponentiation of 100*P.

When the exponentiation is expressed as 100*P=2(2(P+2(2(2(P+2P))))), 100*P is computed by six doublings and two additions of a point on the elliptic curve.

In this way, the computation of an elliptic curve exponentiation is realized by doublings and additions.

Assume here that the equation of an elliptic curve is $y^2=x^3+a \times x+b$, the coordinates of an arbitrary point P on the elliptic curve are $(x_1, y_1)$, and the coordinates of an arbitrary point Q on the elliptic curve are $(x_2, y_2)$. Assume here that the coordinates of a point R defined by R=P+Q are $(x_3, y_3)$.

When P≢Q, R=P+Q is an addition. The addition formulas are $$x_3=\{(y_2-y_1)/(x_2-x_1)\}^2-x_1-x_2, \text{ and}$$

$$y_3=\{(y_2-y_1)/(x_2-x_1)\}(x_1-x_3)-y_1.$$

When P=Q, R=P+Q=P+P=2×P, so that R=P+Q is a doubling. The doubling formulas are $$x_3=\{(3x_1^2+a)/2y_1\}^2-2x_1, \text{ and}$$

$$y_3=\{(3x_1^2+a)/2y_1\}(x_1-x_3)-y_1.$$

Here, the above computations are within the finite field where the elliptic curve is defined.

Details of formulas used in the computation of an elliptic curve exponentiation can be found in "Efficient Elliptic Curve Exponentiation" in Miyaji, Ono and Cohen, Advances in Cryptology-Proceedings of ICICS '97, Lecture Notes in Computer Science, pp. 282-290 (Springer-Verlag, 1997).

7. Conclusions

As described above, the present invention relates to an elliptic curve exponentiation apparatus that computes the exponentiation-result-point kQ on the elliptic curve E(Fp): $y^2=x^3+a \times x+b$ defined over the residual field Fp with the primary number p being a modulus, with the use of an arbitrary point Q on the elliptic curve and a positive integer k smaller than p. The elliptic curve exponentiation apparatus includes a first input unit for inputting coordinates (Qx, Qy) for the point Q, and the exponent k, a second input unit for inputting the coefficient b that is a constant term and is a parameter for the elliptic curve, an elliptic curve coefficient holding unit for holding a fixed value for the coefficient a that is an x term and is a parameter for the elliptic curve, a computation unit for computing the exponentiation-result-point kQ using each value input by the first input unit and the coefficient a held by the elliptic curve coefficient holding unit, a judgment unit for judging whether the coordinates for the exponentiation-result-point kQ computed by the computation unit are on the elliptic curve, using the coefficient b input by the second input unit and the coefficient a held by the elliptic curve coefficient holding unit, and an output unit for outputting the exponentiation-result-point kQ computed by the computation unit only when the judgment unit judges that the coordinates for the exponentiation-result-point kQ are on the elliptic curve.

Here, the elliptic curve exponentiation unit may include, instead of the second input unit, a constant term coefficient computation unit that computes the coefficient b on the constant term using the coordinates for the point Q and the coefficient a, and the judgment unit may use the coefficient b computed by the constant term coefficient computation unit instead of the coefficient b on the constant term input by the second input unit.

Also, the present invention relates to an elliptic curve cryptography apparatus that performs, using elliptic curve cryptography, processes of: encryption of a plaintext; decryption of a ciphertext; generation of a signature for a plaintext; signature verification for a plaintext and a signature; and recovery of a plaintext from a signature. The elliptic curve cryptography apparatus uses the above elliptic curve exponentiation apparatus for the computation processing of an elliptic curve exponentiation in each of the above-described processes.

According to the present invention as described above, the computation of an elliptic curve exponentiation that can counter the DFA can be realized without fixing an elliptic curve. Accordingly, compared with conventional elliptic curve exponentiation apparatuses that can counter the DFA with their elliptic curves being fixed, the elliptic curve exponentiation of the present invention is highly versatile. Therefore, the single elliptic curve exponentiation apparatus of the present invention can be used for multiple applications such as secret communication, digital signature, and key sharing.

Further, the elliptic curve exponentiation apparatus of the present invention can compute an elliptic curve exponentiation with countering the DFA simply by inputting the exponent k and the computation value Q, without fixing an elliptic curve. Accordingly, the elliptic curve exponentiation apparatus of the present invention maintaining its versatility can counter the DFA, with the use of the same input/output method as used in conventional elliptic curve exponentiation apparatuses.

8. Other Modifications

Although the present invention is described based on the above embodiments, it should be clear that the present invention is not limited to the above embodiments. For example, the following modifications are within the scope of the present invention.

(1) Although the above embodiments describe the case where an error message indicating unsuccessful verification is output when verification of an exponentiation-result-point is unsuccessful, such an error message may not be output.

(2) Although the above embodiments describe the case where −3 is employed as a fixed value for a coefficient on the x term of an elliptic curve, based on a known fact that the x term coefficient taking this value enables rapid computation of the elliptic curve exponentiation, a value for such a coefficient may not be fixed but may be received from an external source.

(3) The encryption processing unit 202 of the point issuing apparatus 200 in the point issuing system 10 relating to the first embodiment may perform the same computation processing of an elliptic curve as the processing performed by the IC card 100. To be specific, the elliptic curve computation unit 212 my have the same construction as the elliptic curve computation unit 112, as the elliptic curve computation unit 112a, or as the elliptic curve computation unit 112b.

(4) In the point issuing system 10 relating to the first embodiment, points, which are provided as bonus information from the seller or the service provider to the user purchasing a commodity or using service and can be used as part or all of a payment to the seller or the service provider for next commodity purchase or service use, are subjected to secret communication. The point issuing apparatus 200 encrypts generated points and transmits the encrypted points to the IC card 100. The IC card 100 decrypts the encrypted points to obtain decrypted points, and stores the decrypted points.

However, information other than the points may also be subjected to secret communication.

For example, the present invention can be applied to the following billing system.

As one example, electronic money that can be used instead of real money may be subjected to secret communication. The IC card stores electronic money. When the user purchases a commodity, the IC card encrypts an amount of electronic money corresponding to a payment for the commodity purchase and transmits the encrypted electronic money. Here, the IC card deducts the amount of electronic money encrypted, from the total amount of electronic money internally stored therein. A register apparatus that has the same construction as the point issuing apparatus 200 receives the encrypted electronic money, decrypts the encrypted electronic money to obtain electronic money, and stores the obtained electronic money.

Alternatively, instead of the IC card, an electronic ticket that functions as an IC card for use at various facilities such as an art gallery and a museum may store information corresponding to the electronic money. In this case, an entry management apparatus installed at the entrance of such a facility requests an amount of electronic money corresponding to an entrance fee of the facility. The electronic ticket then encrypts the requested amount of electronic money and transmits the encrypted electronic money to the entry management apparatus. The entry management apparatus receives the encrypted electronic money, decrypts the encrypted electronic money to obtain electronic money, and stores the obtained electronic money.

Alternatively, an electronic railway ticket that functions an IC card for use of public transport such as a railway and a bus may store information corresponding to the electronic money. In this case, an entry management apparatus installed at the entrance of a station of the public transport transmits ID information for identifying the station. The electronic railway ticket receives the ID information, and stores the received ID information. An exit management apparatus installed at the exit of the station then receives the ID information from the electronic railway ticket, calculates a fare based on the received ID information and the station where the exit management apparatus is installed, using a fare list, and requests an amount of electronic money corresponding to the calculated fare. The electronic railway ticket then encrypts the requested amount of electronic money, and transmits the encrypted electronic money to the exit management apparatus. The exit management apparatus receives the encrypted electronic money, decrypts the encrypted electronic money to obtain electronic money, and stores the obtained electronic money.

For the above encryption and decryption, the computation of an elliptic curve exponentiation is performed, with its security being based on the discrete logarithm problem on an elliptic curve. Each apparatus performing this computation of the elliptic curve exponentiation includes a computation unit that is the same as the elliptic curve computation units 112, 112a, or 112b.

(5) In the above billing system, the validity checking may be required for an amount of electronic money transmitted, a transmission destination, a transmission source, etc. In such a case, the digital signature and the signature verification described in the second embodiment can be used.

For the digital signature and the signature verification, the computation of an elliptic curve exponentiation is performed, with its security being based on the discrete logarithm problem on an elliptic curve. Each apparatus performing this computation of the elliptic curve exponentiation includes a computation unit that is the same as the elliptic curve computation units 112, 112a, or 112b.

(6) Information other than the points and the electronic money may also be subjected to secret communication.

The present invention can be applied to a content distribution system roughly composed of an encryption apparatus and a playback apparatus. As one example, digital data of content such as movies, moving images, music, novels, and database may be subjected to secret communication. Such content is provided from a content provider to a user through such a way as selling or renting a storage medium storing the content, or providing the content via digital broadcasting or the Internet.

As one example, the content provider uses its encryption apparatus to encrypt a movie, which is a digital work, and record the encrypted digital work onto a DVD. The user then uses his or her playback apparatus to read the encrypted digital work, decrypt the encrypted digital work to obtain the movie, and display or output the movie by playing back audio and video of the movie.

For the encryption and decryption, the computation of an elliptic curve exponentiation is performed, with its security being based on the discrete logarithm problem on an elliptic curve. Each apparatus performing this computation of the elliptic curve exponentiation includes a computation unit that is the same as the elliptic curve computation units 112, 112a, or 112b.

(7) In the above content distribution system, the DES (Data Encryption Standard) may be employed as an encryption technique used to encrypt digital works. The DES is called a "shared key encryption technique" (or a secret key encryption technique).

In the above content distribution system employing such a shared key encryption technique, how to securely share the same secret key between the encryption apparatus and the playback apparatus in the system is one of the major challenges.

The key sharing system described in the third embodiment can realize the secure sharing of a secret key.

The key sharing system described in the third embodiment enables a secret key to be shared between the encryption apparatus and the playback apparatus without revealing the secret key to third parties. Thereafter, an encryption algorithm according to the shared key encryption technique can be applied, so that the encryption apparatus can encrypt a digital work using the shared secret key, and the playback apparatus can decrypt the encrypted digital work using the shared secret key.

For the above key sharing, the computation of an elliptic curve exponentiation is performed, with its security being based on the discrete logarithm problem on an elliptic curve. Each apparatus performing this computation of the elliptic curve exponentiation includes a computation unit that is the same as the elliptic curve computation units 112, 112a, or 112b.

(8) The computation result verification unit 127 may judge whether the computation value Q and the exponentiation-result-point k*Q are on the same elliptic curve, instead of judging whether the exponentiation-result-point k*Q is on the elliptic curve E.

To be specific, the computation result verification unit 127 obtains the coordinates (Qx, Qy) as the computation value Q, and the coordinates (Qx', Qy') as the exponentiation-result-point k*Q, and judges whether $(Qy^2-Qx^3-a\times Qx)-(Qy'^2-Qx'^3-a\times Qx')=0$. When judging that $(Qy^2-Qx^3-a\times Qx)-(Qy'^2-Qx'^3-a\times Qx')=0$, the computation result verification unit 127 judges that the computation value Q and the exponentiation-result-point k*Q are on the same elliptic curve. When not judging that $(Qy^2-Qx^3-a\times Qx)-(Qy'^2-QX'^3-a\times Qx')=0$, the computation result verification unit 127 judges that the computation value Q and the exponentiation-result-point k*Q are not on the same elliptic curve.

The computation result output unit 125 outputs the exponentiation-result-point k*Q only when the computation result verification unit 127 judges that the computation value Q and the exponentiation-result-point k*Q are on the same elliptic curve.

(9) The present invention may be realized by the methods described above. Also, the present invention may be realized by a computer program executed on a computer for realizing these methods, or by a digital signal representing the computer program.

Also, the present invention may be realized by computer-readable recording media on which the computer program or the digital signal is recorded. Examples of the recording media include a flexible disk, a hard disk, a CD-ROM, an MO, a DVD, a DVD-ROM, a DVD-RAM, a BD (Blu-ray Disc), and a semiconductor memory. The present invention may also be realized by the computer program or the digital signal recorded on such recording media.

The present invention may be realized by the computer program or the digital signal transmitted via an electric communication line, a wired/wireless line, a network such as the Internet, data broadcasting, and the like.

Moreover, the present invention may be realized by a computer program including a microprocessor and a memory. The memory may store the computer program, and the microprocessor may operate in accordance with the computer program.

The computer program or the digital signal may be transferred as being recorded on the recording medium, or via the network and the like, so that the computer program or the digital signal may be executed by another independent computer system.

(10) The above embodiments and the modifications can be freely combined.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

9. Industrial Application

The present invention can be applied to such cases where in the billing industry information about an amount of money or other information are transmitted confidentially from the sender to the receiver without being revealed to third parties. Further, the present invention can be applied when the validity of such information is to be verified. The billing industry to which the present invention is applied includes not only the financial industry consisting of banks, securities, insurance companies, etc., but also other general industries involving such transactions as commodity sale. Further, each apparatus constituting such a billing system is manufactured and sold by the electric equipment manufacturing industry.

Further, the encryption apparatus and the playback apparatus constituting the content distribution system of the present invention are manufactured and sold by the electric equipment manufacturing industry. The content distribution system is commercially utilized repeatedly and continuously in the information provision industry where digital works such as music, movies, and novels are provided from the content provider to the user by selling or renting such digital works.

What is claimed is:

1. An information security apparatus that ensures secure handling of predetermined information by computing an elliptic curve exponentiation of k*Q, based on computational complexity of solving a discrete logarithm problem on an elliptic curve E: $y^2=x^3+a\times x+b$ defined over a residue field F with a prime p being a modulus, comprising:

an information obtaining unit operable to obtain a point Q that is on the elliptic curve E, and an exponent k that is a positive integer smaller than the prime p;

a first storage unit operable to store therein a coefficient a that is a linear term of the elliptic curve E;

a computation unit operable to compute an elliptic curve exponentiation of the exponent k and the point Q using the coefficient a stored in the first storage unit, to obtain an exponentiation-result-point k*Q;

a judgment unit operable to judge whether the point Q and the obtained exponentiation-result-point k*Q are on the elliptic curve E; and a prohibition unit operable to prohibit an output of the obtained exponentiation-result-point k*Q, when a judgment result of the judging unit is negative; and a processing unit operable to realize, when the judgment result of a judging unit is affirmative, one of the processes of: encryption of a plaintext, decryption of a ciphertext; generation of a signature for a plaintext; signature verification for a plaintext and a signature; or a process of sharing of a secret key between two parties without revealing the secret key to a third party, with the use of the obtained exponentiation-result-point k*Q;

wherein the information obtaining unit obtains coordinates (Qx, Qy) as the point Q, the computation unit computes coordinates (Qx', Qy') as the exponentiation-result-point k*Q, and the judgment unit judges whether the point Q and the exponentiation-result-point k*Q are on the same elliptic curve, by judging whether $(Qy^2 - Qx^3 - aXQx) - (Qy'^2 - Qx'^3 - aXQx') = 0$; and an output unit configured to output one of an encrypted text, a decrypted ciphertext, signature data, a verification result, and a shared key.

2. An information security method for use in an information security apparatus that ensures secure handling of predetermined information by computing an elliptic curve exponentiation of k*Q, based on computational complexity of solving a discrete logarithm problem on an elliptic curve E: $y^2 = x^3 + a \times x + b$ defined over a residue field F with a prime p being a modulus, and that includes an information obtaining unit, a first storage unit storing a coefficient a that is a linear term of the elliptic curve E, a computation unit, a judgment unit, a prohibition unit, and a processing unit, the method comprising:

executing an information obtaining step by the information obtaining unit for obtaining a point Q that is on the elliptic curve E, and an exponent k that is a positive integer smaller than the prime p;

executing a computation step by the computation unit for computing an elliptic curve exponentiation of the exponent k and the point Q using the coefficient a stored in the first storage unit, to obtain an exponentiation-result-point k*Q;

executing a judgment step by a judgment unit for judging whether the point Q and the obtained exponentiation-result-paint k*Q are on the elliptic curve E;

executing a prohibition step by the prohibition unit for prohibiting an output of the obtained exponentiation-result-point k*Q, when a judgment result of the judgment step is negative;

executing a processing step by the processing unit for realizing, when the judgment result of the judgment step is affirmative, one of the processes of: encryption of a plaintext, decryption of a ciphertext; generation of a signature for a plaintext; signature verification for a plaintext and a signature; or a process of sharing of a secret key between two parties without revealing the secret key to a third party, using the obtained exponentiation-result-point k*Q, wherein, in the information obtaining step, the information obtaining unit obtains coordinates (Qx, Qy) as the point Q;

in the computation step, the computation unit computes coordinates (Qx', Qy') as the exponentiation-result-point k*Q; and in the judgment step, the judgment unit judges whether the point Q and the exponentiation-result-point k*Q are on the same elliptic curve, by judging whether $(Qy^2 - Qx^3 - a \times Qx) - (Qy'^2 - Qx'^3 - a \times Qx') = 0$; and an output unit configured to output one of an encrypted text, a decrypted ciphertext, signature data, a verification result, and a shared key.

3. A computer program stored on a computer readable medium which, when executed on a computer, performs each of the steps of the method of claim 2.

4. The computer program stored on a computer readable medium of claim 3, recorded on a computer-readable recording medium.

* * * * *